(12) United States Patent
Wang

(10) Patent No.: US 11,801,829 B2
(45) Date of Patent: Oct. 31, 2023

(54) IN-VEHICLE DEVICE, SYSTEM AND METHOD FOR AUTOMATIC PARKING ASSISTANCE

(71) Applicant: Volvo Car Corporation, Gothenburg (SE)

(72) Inventor: Wei Wang, Shanghai (CN)

(73) Assignee: Volvo Car Corporation, Gothenburg (SE)

( * ) Notice: Subject to any disclaimer, the term of this patent is extended or adjusted under 35 U.S.C. 154(b) by 373 days.

(21) Appl. No.: 17/168,302

(22) Filed: Feb. 5, 2021

(65) Prior Publication Data

US 2021/0245736 A1 Aug. 12, 2021

(30) Foreign Application Priority Data

Feb. 7, 2020 (CN) .......................... 202010082498.6

(51) Int. Cl.
*B60W 30/06* (2006.01)
*B60W 10/20* (2006.01)
(Continued)

(52) U.S. Cl.
CPC ............ *B60W 30/06* (2013.01); *B60W 10/20* (2013.01); *B60W 30/09* (2013.01);
(Continued)

(58) Field of Classification Search
CPC ...... B60W 30/06; B60W 10/20; B60W 30/09; B60W 40/072; B60W 2552/30;
(Continued)

(56) References Cited

U.S. PATENT DOCUMENTS

| 2017/0313306 A1 | 11/2017 | Nordbruch et al. |
| 2018/0046198 A1 | 2/2018 | Nordbruch et al. |
| 2019/0227555 A1* | 7/2019 | Sun .................. G08G 1/096716 |

FOREIGN PATENT DOCUMENTS

WO     2018198506 A1    11/2018

OTHER PUBLICATIONS

Jun. 23, 2022 Communication pursuant to Article 94(3) EPC of the counterpart EP Application No. 21 155 110.6.

(Continued)

*Primary Examiner* — Daryl C Pope
(74) *Attorney, Agent, or Firm* — Clements Bernard Walker; Christopher L. Bernard

(57) ABSTRACT

An in-vehicle device, a system and a method for automatic parking assistance. The in-vehicle device includes a communication interface through which the in-vehicle device receives a parking navigation path from an external device, the parking navigation path including linear road sections and/or arc road sections; and a parking controller coupled with the communication interface. The parking controller is configured to identify line-shape features of each road section; determine whether the vehicle can travel along a road section based on line-shape features of the road section; in the case that the determination is affirmative, control a driving behavior of the vehicle such that the vehicle travels along the road section; in the case that the determination is negative, determine a new travelling path and control a driving behavior of the vehicle such that the vehicle travels along the new travelling path.

16 Claims, 6 Drawing Sheets

(51) Int. Cl.
*B60W 30/09* (2012.01)
*B60W 40/072* (2012.01)
*G07C 5/00* (2006.01)
*G06V 20/56* (2022.01)

(52) U.S. Cl.
CPC ......... *B60W 40/072* (2013.01); *G06V 20/588* (2022.01); *G07C 5/008* (2013.01); *B60W 2540/18* (2013.01); *B60W 2552/30* (2020.02)

(58) Field of Classification Search
CPC ................. G06V 20/588; G07C 5/008; G05D 2201/0213; G05D 1/0282; B62D 15/0285; G08G 1/096833
See application file for complete search history.

(56) References Cited

OTHER PUBLICATIONS

Jun. 16, 2021 Extended European Search Report issued in International Application No. 202010082498.6.

\* cited by examiner in-vehicle device, system and method for automatic parking assistance

CROSS-REFERENCE TO RELATED APPLICATION

The disclosure claims the benefit of priority of co-pending Chinese Patent Application No. CN 202010082498.6, filed on Feb. 7, 2020, and entitled "IN-VEHICLE DEVICE, SYSTEM AND METHOD FOR AUTOMATIC PARKING ASSISTANCE," the contents of which are incorporated in full by reference herein.

TECHNICAL FIELD

The disclosure relates generally to the technical field of automatic parking assistance. Specifically, it relates to an in-vehicle device for automatic parking assistance, to an automatic parking assist system including the in-vehicle device, and to an automatic parking assist.

BACKGROUND

Autonomous driving technology for vehicles is a hot research topic today. Among the many functions of vehicle autonomous driving, the function of automatic parking assistance draws lots of attention because it does great help to park a vehicle.

The existing solutions for automatic parking assistance mostly take vehicles as the intelligent agent, that is, the vehicle is constructed as the mobile agent. For instance, during an automatic parking process, sensors of a vehicle continuously track the distance between the vehicle and its surroundings after getting to the desired parking place, and a controller of the vehicle will adjust movements of the vehicle based on the distance. Thus, the vehicle could arrive at the desired parking place collision-freely. Therefore, in a vehicle, sensors with a strong sensing capability and a controller with a strong computing capability are needed. The existing solutions are costly since the sensors and controller with the needed capabilities are expensive.

Therefore, it is desired to have a technical solution to solve the above problems.

SUMMARY

In view of the above problems in the prior art, this disclosure aims to provide an improved technical solution, which can reduce costs and increase efficiency, for automatic parking assistance.

According to one aspect of the disclosure, an in-vehicle device for automatic parking assistance is provided, wherein the in-vehicle device includes a communication interface, through which the in-vehicle device receives a parking navigation path from an external device outside a vehicle. The parking navigation path comprises one or more road sections, wherein the one or more road sections include linear road sections and/or arc road sections; and a parking controller coupled with the communication interface. The parking controller is configured to: identify line-shape features of each road section, wherein the line-shape features includes an orientation of a linear road section and/or a radius of curvature of an arc road section; determine whether the vehicle can travel along a road section based on line-shape features of the road section; in the case that the determination is affirmative, control a driving behavior of the vehicle such that the vehicle travels along the road section; in the case that the determination is negative, determine a new travelling path and control a driving behavior of the vehicle such that the vehicle travels along the new travelling path.

According to another aspect of the disclosure, an automatic parking assistance system including a remote server wirelessly communicated with a vehicle is provided. The remote server is configured to provide a parking navigation path for assisting automatic parking, and to provide, based on geometric features of the parking navigation path, one or more road sections of the parking navigation path, wherein the one or more road sections are linear road sections and/or arc road sections; and the in-vehicle device as described above, the in-vehicle device wirelessly communicates with the remote server, the in-vehicle device is also configured to control a driving behavior of the vehicle based on the parking navigation path and line-shape features of the one or more road sections for the parking navigation path.

According to still another aspect of the disclosure, there is an automatic parking assistance method that can be executed by the in-vehicle device as described above and/or the automatic parking assistance system as described above, wherein the method includes: receiving a parking navigation path that includes one or more road sections, wherein the one or more road sections include linear road sections and/or arc road sections; identifying line-shape features of each road section that include an orientation of a linear road section and/or a radius of curvature of an arc road section; determining whether the vehicle can travel along a road section based on line-shape features of the road section; in the case that the determination is affirmative, controlling a driving behavior of the vehicle such that the vehicle travels along the road section; in the case that the determination is negative, determining a new travelling path and control a driving behavior of the vehicle such that the vehicle travels along the new travelling path.

According to embodiments of the disclosure, the parking navigation path has been divided "perfectly." Thus the computing cost for completing the parking navigation path and the complexity of travelling behaviors of a vehicle are greatly reduced, because the vehicle can travel with the same travelling behaviors and travel with just several simple operations for each road section.

Moreover, according to embodiments of the disclosure, before executing manipulations for automatic parking assistance, the parking navigation path used for guiding the vehicle parking automatically has been computed and accurately divided in an external device, and thus the passing ability of the vehicle during the automatic parking is greatly improved.

Further, in one embodiment of the disclosure, the system also checks whether the actual trajectory deviates from the parking navigation path and takes corresponding measures in the case of deviation, which greatly improves the success rate and safety of the automatic parking.

DETAILED DESCRIPTION

The disclosure generally relates to a technical solution of automatic parking assistance. In the disclosure, "automatic parking assistance" includes assisting a vehicle to travel from a drop-off position to a parking position and from a parking position to a drop-off position.

In the disclosure, "parking navigation path" refers to a path between a parking position and a drop-off position. The path may be implemented using the parking position as a starting position and the drop-off position as an ending point, or the drop-off position as a starting position and the parking position as an ending point.

In the disclosure, "parking position" refers to a position within or proximate to a parking space (such as a parking spot in a parking lot). For example, a parking position can be the position where the vehicle turns from its current travel lane and enters into the parking space. In one embodiment, the vehicle may start turning at half of the width of the parking space along the central line of the current travel lane, which is the parking position in this case.

In the disclosure, "drop-off position" may be a position at which a driver can park a vehicle for automatically parking and then retrieve the vehicle from that position. For example, on a parking lot, a vehicle is controlled to travel to the parking position from the drop-off position and is pulled into a parking space from the parking position.

In the disclosure, "parking area" may be understood as a defined area including two positions (a parking position and a drop-off position described above), and a vehicle performs automatic driving (e.g., automatic parking) between the two positions. "Parking area" may be an area with multiple parking spots, for example, a parking lot or a garage that includes multistory parking lots. The "parking area" may also be an area in some places such as a port, a mining area, etc.

Embodiments of the disclosure will be described now.

Figure 1:
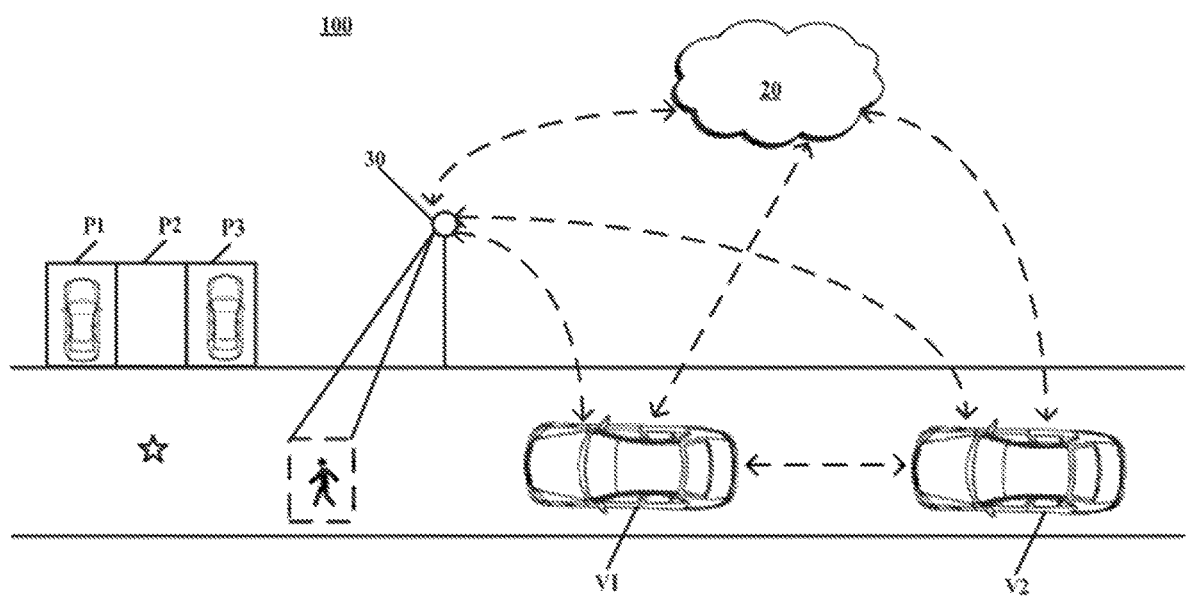
FIG. 1 illustrates an exemplary operating environment in which embodiments of the disclosure can be implemented.
Figure 2:
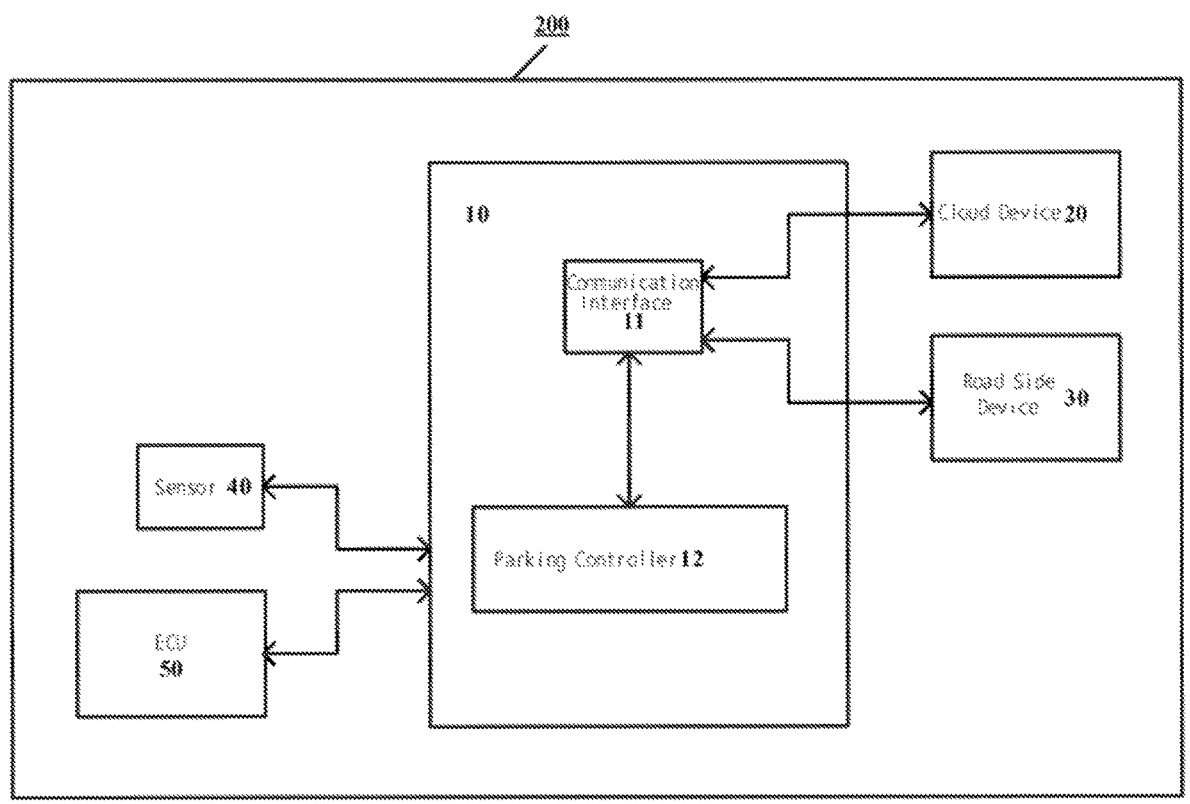
FIG. 2 is a schematic block diagram of an automatic parking assistance system according to an embodiment of the disclosure, the system including an in-vehicle device for automatic parking assistance according to an embodiment of the disclosure.

FIG. 1 illustrates an exemplary operating environment 100 in which some embodiments of the disclosure can be implemented. FIG. 2 schematically illustrates an automatic parking assistance system 200. The system 200 includes an in-vehicle device 10 according to an embodiment of the disclosure.

Referring to FIGS. 1 and 2, the operating environment 100 can be a synergetic ecosystem (may also be called an intelligent parking system) for automatic parking, but the disclosure is not limited to the specific framework. In some embodiments, the operating environment 100 may include multiple vehicles V1 and V2 that can communicate with one another, a remote server (e.g., a cloud device) 20 and a roadside facility (e.g., a roadside device) 30. In the operating environment 100, the in-vehicle device 10 is mounted to the vehicle V1, and any two of the in-vehicle device 10, the remote server 20 and the roadside facility 30 can communicate with each other The operating environment 100 also includes a parking area including multiple parking spots P1-P3 and obstacles (which may be potential collision objects for the vehicle V1). One example of the obstacles is a person, who is walking on the current travel lane of the vehicle V1, represented in the FIG. 1.

The parking assistant system 200 mainly includes the in-vehicle device 10 installed in the vehicle V1, the remote server (e.g., a cloud device) 20 outside the vehicle V1 and the roadside device (e.g., a roadside device) 30. Hereinafter components of the parking assistant system 200 will be now detailed.

The remote server 20 has data analyzing and processing capability. The remote server can be implemented as a single server or as server arrays or clusters. In some embodiments, the remote server may be deployed in a distributed computing environment and may be implemented by means of cloud computing technology. For example, the remote server may be implemented as a cloud server.

The roadside facility 30 may include roadside sensors, a computing device and a communication unit. The roadside sensors are used for sensing (capturing) traffic condition in a parking area, such as the obstacle information around the vehicle. The roadside sensors may include a camera and/or radar (e.g., lidar or millimeter wave radar). The computing device may communicate with the sensors in a wired or wireless manner or a manner of a combined wired and wireless connection. The computing device may be used for analyzing and processing traffic information representing traffic conditions and the traffic information is sensed by the sensors. The computing device is also arranged to integrate with the sensors. The communication unit is configured to communicate with both of the roadside sensors. The communication unit may wirelessly transmit the information sensed by the roadside sensors or the computation result computed by the computing device to a vehicle in the parking area.

In an embodiment taking parking lots as application scenarios for automatic parking, the roadside sensors are disposed at several places in the parking lots to achieve no-blind-area coverage of the parking lots. The roadside sensors may transmit sensed traffic information to vehicles in the parking lot, so that parking assist devices (in-vehicle devices) in the vehicles can identify and process the information to assist the automatic parking. The roadside sensors may also transmit the sensed traffic information to the computing device. The computing device may analyze and process the traffic information and then transmit analyzed and processed results to vehicles in the parking lot to assist the automatic parking.

The in-vehicle device 10 can be an in-vehicle terminal. In one embodiment, the in-vehicle device 10 mainly includes the communication interface 11 and the parking controller 12 communicated with the communication interface 11. The in-vehicle device 10 performs information interaction with the remote server 20 and the roadside facility 30 in a wireless communication manner via the communication interface 11. For example, the in-vehicle device 10 receives information (e.g., instructions and/or data) from the remote server 20 and/or the roadside facility 30 via the communication interface 11, and transmits the information to the parking controller 12 so that the parking controller 12 controls a parking process based on the information.

The parking controller 12 is used for controlling the vehicle V1 to park automatically. For example, after receiving a parking navigation path including one or more road sections from external devices (e.g., the remote server 20 or the roadside facility 30) via the communication interface 11, the in-vehicle device 10 identifies and analyzes geometric features of each road section to determine travelling strategies for each road section and for travelling from the current road section to the next adjacent road section such that the vehicle is controlled to complete the parking navigation path according to the travelling strategies. The parking controller 12 can be realized in hardware, software, or a combination thereof. Working principles of the parking controller 12 will be further described below.

The in-vehicle device 10 is configured to communicate with one or more components of the vehicle V1. The one or more components include an in-vehicle sensor 40 and a control unit 50 in the vehicle V1. The in-vehicle sensor 40 may include an ultrasonic sensor for detecting range information. The ultrasonic sensor may include multiple ultrasonic sensors (e.g., an ultrasonic radar) mounted on the perimeter of the vehicle. The sensor in the vehicle V1 may also include an image capturing apparatus; the image capturing device may include multiple cameras mounted on the vehicle V1. The image capturing device is used to capture pictures and/or videos including traffic conditions around the vehicle V1. The control unit 50 in the vehicle V1, for example, is an electronic control unit (ECU).

It is noted that the parking controller 12 in the in-vehicle device 10 may be disposed in the ECU, i.e., the control strategies of automatic parking assistance according to the disclosure is realized through the ECU. The parking controller 12 may also be constructed as a controller separate from the ECU and communicated with the ECU.

The in-vehicle device 10 and the remote server 20 may be communicatively coupled via a network, which can be implemented as a wireless network, and the wireless network may be based on any wireless communication technologies and/or standards. For example, the network may include telecommunication network provided by telecom operators with any standards. The network may be implemented as a single network, and may also be implemented to include multiple networks. The network may also include Internet of Thing (IoT). Network may also be implemented as a self-organizing wireless network.

The in-vehicle device 10 may communicate peer-to-peer with the roadside facility 30. For example, communications between the in-vehicle device 10 and the roadside facility 30 may be performed by means of V2X network (DSRC/C-V2X), WLAN, infrared (IR) network, Bluetooth network, near field communication (NFC) network or ZigBee network.

Additionally, the vehicle V1, as one node in the operating environment 100, is able to communicate with other nodes in the operating environment 100. Other nodes may include the other vehicle V2, mobile terminals (not shown), etc. For example, the vehicle V1 may interact with the other vehicle V2 in the parking area, i.e., vehicles in the parking area may perform V2V communications with each other.

Figure 3:
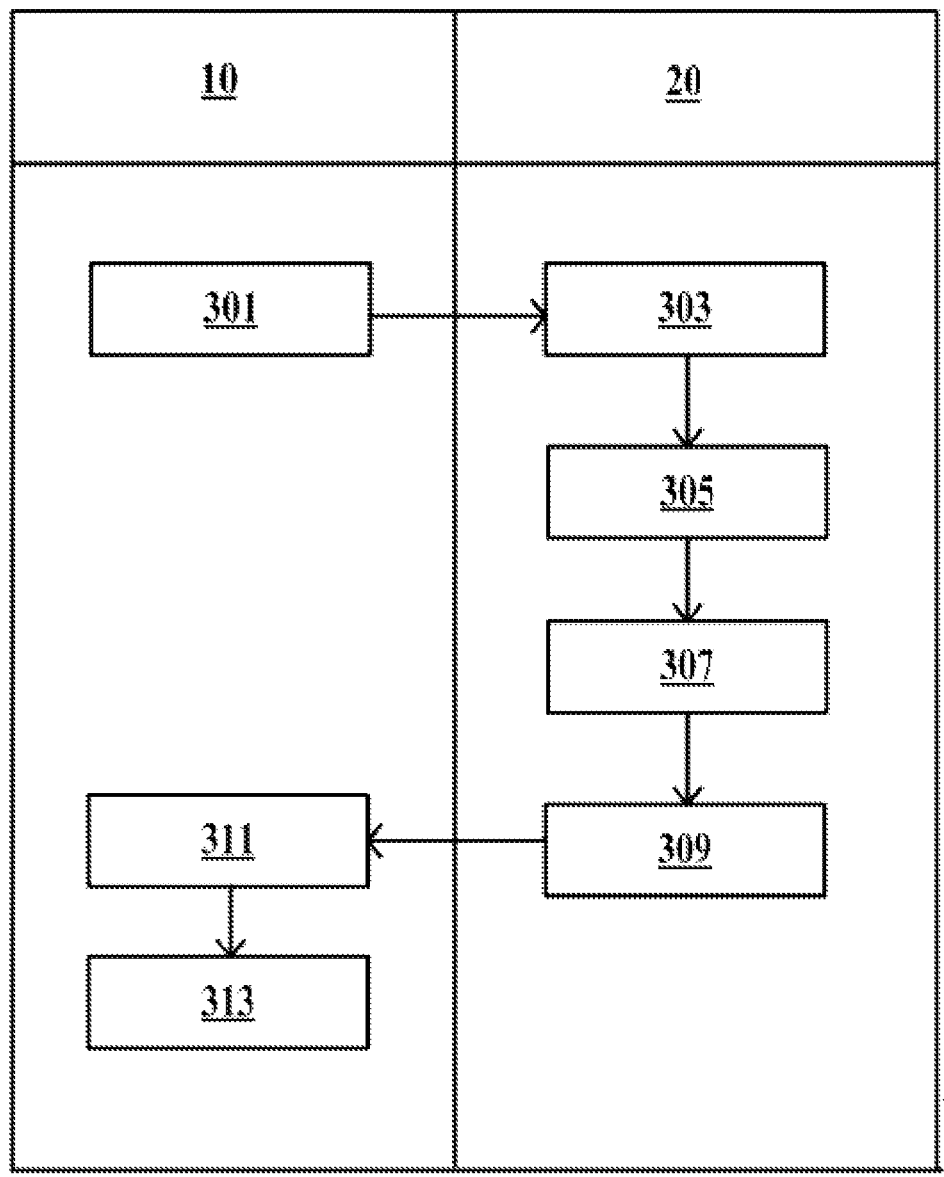
FIG. 3 is a swim-lane diagram illustrating an exemplary communication between an in-vehicle device and a remote server according to one embodiment of the disclosure.

FIG. 3 is a swim-lane diagram illustrating an exemplary communication between an in-vehicle device 10 and a remote server 20 according to an embodiment of the disclosure. The working principle and process of the in-vehicle device 10 will be explained with reference to FIG. 3.

First, when the vehicle V1 (i.e., the ego vehicle) is required to park automatically, an automatic parking request may be transmitted to the remote server 20 by the in-vehicle device 10 or a remote device communicated with the in-vehicle device 10 to request a parking navigation path for assisting the automatic parking (block 301).

It is noted that the automatic parking request may be transmitted from inside or outside of the vehicle V1. For example, the in-vehicle device 10 may further include a button for transmitting the automatic parking request. A driver of the vehicle V1 may press the button inside the vehicle to trigger the transmission of the request to the remote server 20. A driver, who is outside the vehicle V1, may also operate a mobile terminal (e.g., a smart phone) communicated with the vehicle V1 to trigger the transmission of the request to the remote server 20.

The remote server 20 computes a parking navigation path (block 305) based on stored information after receiving (block 303) the automatic parking request. The parking navigation path is a path between the parking position and drop-off position. The stored information includes: (1) map data of the parking area, e.g., a high precision map (HP Map); (2) status of parking spots in the parking area, for example, which parking spots are already occupied or still empty, and sizes and locations of the parking spots; (3) the current position of the vehicle V1; (4) traffic laws and regulations, for example, the vehicle V1 should travel along the right-hand side or the left-hand side according to the current traffic regulations, and route regulations of the current parking area (e.g., a parking lot).

It is noted that when the vehicle V1 exits a parking spot, the starting point of the parking navigation path is the parking position and the ending point is the drop-off position. It is noted that when the vehicle V1 enters into a parking spot, the starting point of the parking navigation path is the drop-off position and the ending point is the parking position. In this case, the remote server 20 is required to select an available parking spot for the vehicle V1 in the parking area. Various strategies may be taken to select the parking spot. For example, the farthest available parking spot is selected for the first-in vehicle, or an available parking spot is selected based on a shortest path during parking, or an available parking spot is selected based on being closest to the vehicle door, etc.

Then, the remote server 20 determines one or more road sections according to geometric features of the parking navigation path (block 307). The one or more road sections include: (1) one or more linear road sections; (2) one or more arc road sections; (3) combination of linear and arc road sections. That is, the parking navigation path is divided with straight lines and/or arcs. For example, if a portion of the parking navigation path is an elliptical path, and the elliptical path will be divided into several arc road sections. Examples of the parking navigation path will be described below.

In an example, the parking navigation may include only one linear road section. In this example, the parking navigation path includes starting and ending points and a linear road section between them.

In another example, the parking navigation path may include two or more linear road sections, and there is an angle (the angle may be a right angle or an angle having a degree other than zero) between any two adjacent road sections of the linear road sections.

In yet another example, the parking navigation path may include only one arc road section. In this example, the parking navigation path includes starting and ending points and an arc road section between them.

In still another example, the parking navigation path may include two or more arc road sections, and any two adjacent road sections of the arc road sections have different radiuses of curvature.

In a further example, the parking navigation path includes any combination of linear and arc road sections.

In embodiments where the parking navigation path includes two or more road sections, the remote server 20 may divide the parking navigation path in such a manner, i.e., determining one or more reference points on the parking navigation path according to geometric features of the parking navigation path. Road sections are defined by any two adjacent points among the reference points, the starting and ending points of the parking navigation path such that any two adjacent road sections have different line-shape features. For example, two adjacent arc road sections have different radiuses of curvature, or two adjacent linear road sections have different orientations, or two adjacent road sections includes a linear and an arc road sections.

It is noted that the number of reference points may be one or more. In the case of one reference point, the reference point together with the starting and ending points define two road sections of the path. In the case of more than one reference points, any two adjacent points among the reference points, the starting and ending points of the path define a road section.

Then, the remote server 20 transmits the parking navigation path including one or more road sections to the in-vehicle device 10 (block 309). The in-vehicle device 10 receives the parking navigation path via the communication interface 11 (block 311). It is noted that the parking navigation path received by the in-vehicle device 10 has been divided into road sections, i.e., the received parking navigation path includes one or more divided road sections.

It is noted that calculating and dividing operations executed by the remote server 20 may also be implemented by one or more computing devices in the roadside facility 30. That is, the parking navigation path is divided by the computing devices in the roadside facility 30 and then is transmitted to the vehicle V1 via a communication unit of the roadside facility.

It is seen that the parking navigation path may be divided by the remote server 20 and received by the vehicle V1 via the communication interface 11; the parking navigation path may also be divided by a computing device in the roadside devices 30 and received by the vehicle V1 via the communication interface 11. The remote server and the roadside facility are both located outside the vehicle V1 and may be collectively referred as external devices. In other words, the in-vehicle device 10 receives the parking navigation path (the divided parking navigation path) from external devices via the communication interface 11.

Next, the parking controller 12 performs control strategies to control the vehicle V1 to implement the parking navigation path (block 313), i.e., the parking controller 12 controls travelling behaviors of the vehicle V1 so that the vehicle V1 may travel from the starting point to the ending point of the parking navigation path.

Generally, the parking controller 12 performs control strategies including identifying line-shape features of each road sections; determining travelling behaviors for implementing each road section according to the identified line-shape features; and controlling vehicles to perform the travelling behaviors to complete parking navigation path. For example, the parking controller 12 determines whether the vehicle can travel along the road sections in accordance with the line-shape features of each road section, if the determination is affirmative, controls driving behaviors of the vehicle such that the vehicle travels along the road sections; if determination is negative, determines a new travelling path such that the vehicle travels along the new travelling path.

Examples where vehicles may travel along road sections and corresponding control strategies are further described below.

In the case that the current road section is identified as a linear road section, the parking controller 12 determines orientation of the linear road section and controls the vehicle to travel in the same orientation as that of the linear road section so that the vehicle can travel along the linear road section.

In the case where the current road section is identified as an arc road section with its radius of curvature of the arc road section being greater than or equal to the minimum turning radius, the parking controller 12 takes the radius of curvature of the road section as the turning radius of the vehicle V1 and determines a steering angle for the vehicle V1 to realize the turning radius (for example, a steering angle of the steering wheel of the vehicle V1 is determined according to the design of the steering system of the vehicle V1 so that turning behaviors of the vehicle V1 match the steering angle), and the vehicle V1 is controlled to travel with the determined steering angle from an entering point (i.e., the starting point of the arc road section) to an exiting point (i.e., the ending point of the arc road section) of the arc road section.

Figure 4A:
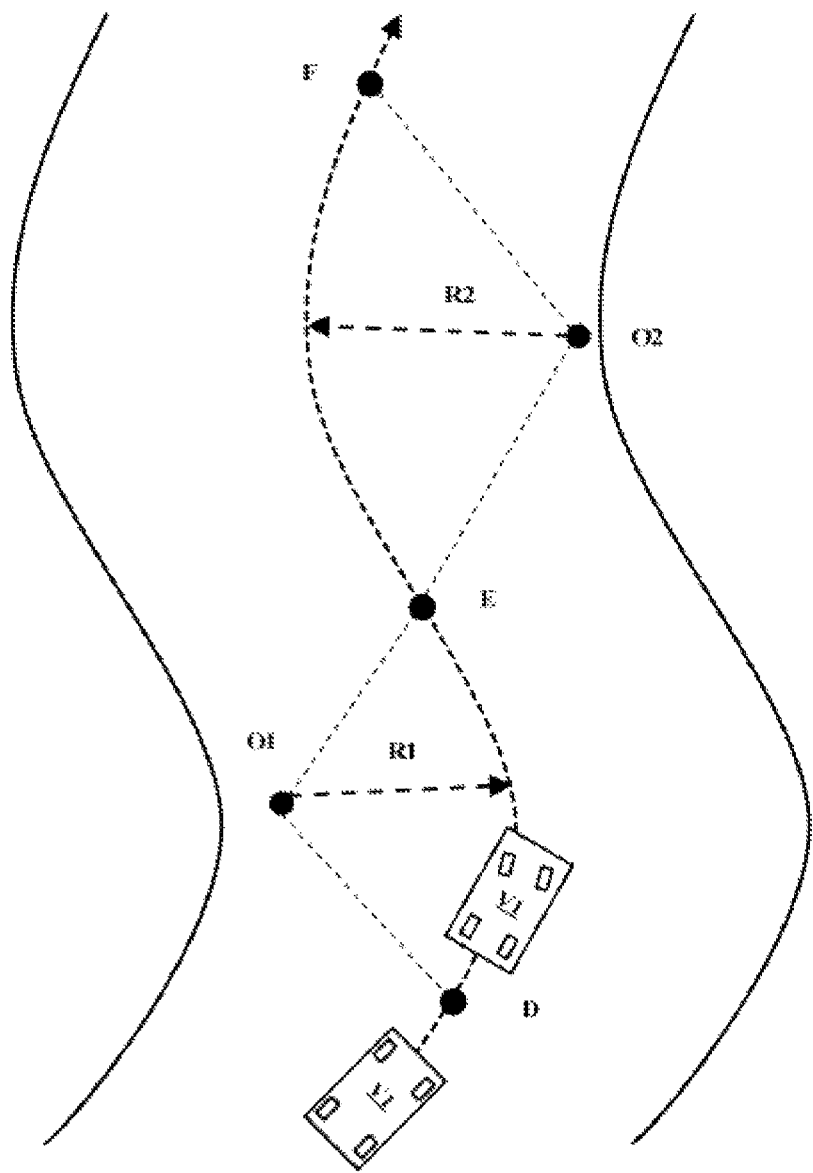
FIG. 4A and FIG. 4B schematically illustrate a working principle of the in-vehicle device according to an embodiment of the disclosure.

Referring to FIG. 4A, in the case where both the current road section DE and the next adjacent road section EF are identified as arc road sections with the radiuses of curvature of the two arc road sections R1, R2 being both greater than or equal to the minimum turning radius, the parking controller 12 controls the vehicle V1 to travel along the current road section DE and then controls the vehicle V1, at the exiting point E of the current road section DE (i.e., the entering point of the next adjacent road section EF), to travel with a steering angle so that the vehicle V1 can travel along the next adjacent road section EF.

It is noted that the minimum turning radius of a vehicle is known based on its type and size. For example, a steering center of a vehicle may be determined according to the minimum turning radius and GPS points of the vehicle. An arc road section may be determined according to the steering center and the turning radius.

It is noted that, when external devices determine arc road sections, the maximum turning radius allowed in the current road is considered. The maximum turning radius is computed according to the road information such as the number of lanes, the lane width so that vehicle wheels will not press the lane line if the vehicle travels with the computed turning radius. This is favorable because road information is obtained outside a vehicle from maps (HD Maps) and a parking navigation path, with which the maximum turning radius allowed in the current road, will not be exceeded. In this way, it saves computing cost and time needed for judging and computing the maximum turning radius and thus the automatic parking efficiency is improved.

Some examples where vehicles cannot travel along road sections and corresponding control strategies are described below.

In the case where the current road section is identified as an arc road section with its radius of curvature smaller than the minimum turning radius of the vehicle V1, the parking controller computes a new arc road section taking the optimum turning radius as the turning radius of the vehicle V1 and the new arc road section as a new travelling path. In order to enable the vehicle V1 to travel along the new arc road section, the starting point of the original arc road section may be moved by a distance towards an opposite direction of the travelling direction of the vehicle V1, so that the moved point and the ending point constitute the new arc road section. The vehicle V1 is controlled to execute corresponding steering operations at the moved point, i.e., the vehicle V1 travels with a steering angle for implementing the new arc road section.

Figure 4B:
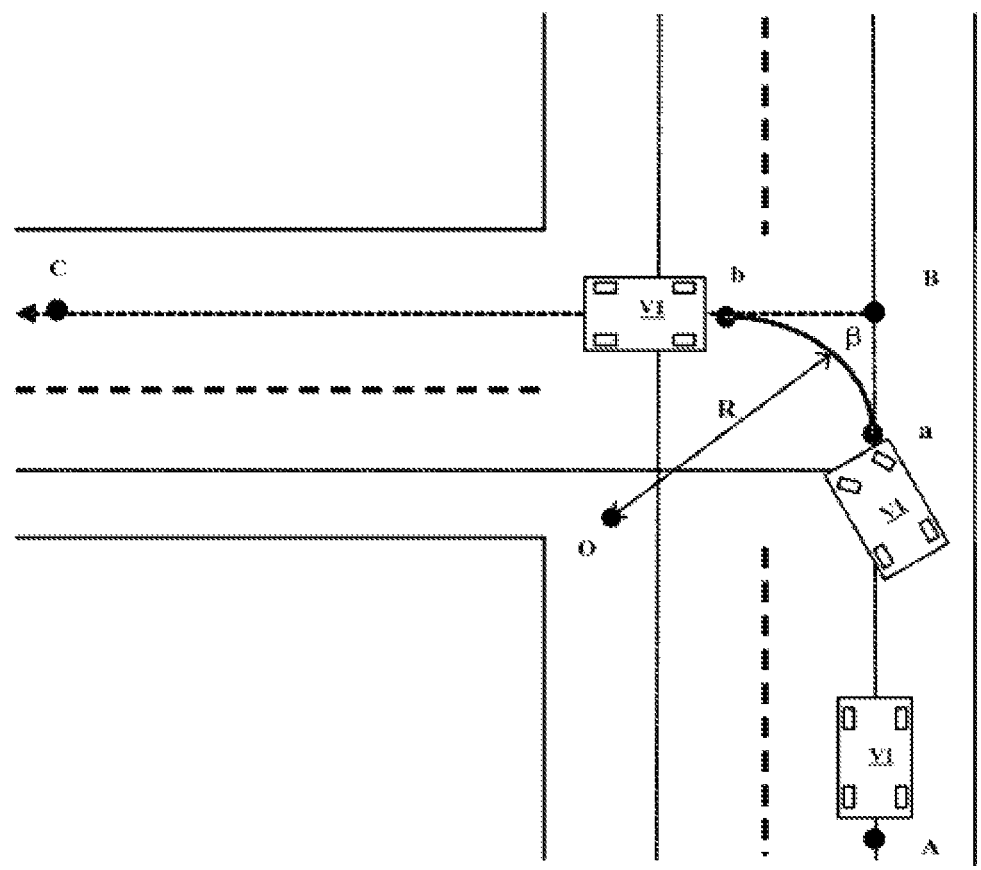

Referring to FIG. 4B, in the case that both the current and next adjacent road sections are identified as linear road sections with different orientations (e.g., the angle between the two linear road sections is a right angle), a new arc road section is required to enable the vehicle V1 to travel from the current linear road section to the next adjacent linear road section along the new arc road section.

In this case, the parking controller 12 may perform the following operations: computing a new arc road section taking the optimum turning radius as the turning radius of the vehicle V1; acquiring an intersection of the new arc road section and the current road section AB as the entering point of the new arc road section, and acquiring an intersection b of the new arc road section and the next adjacent road section BC as the exiting point of the new arc road section; determining a steering angle for the vehicle to implement the new arc road section ab; and controlling the vehicle V1 to travel with the steering angle from the entering point a to the exiting point b.

In one embodiment, the optimum turning radius may be the minimum turning radius of the vehicle V1. In other words, the minimum turning radius of the vehicle V1 is taken as the optimum turning radius.

In another embodiment, the optimum turning radius may also be a sum of the minimum turning radius of the vehicle V1 and an optimized compensation. The optimized compensation may be determined by means of a property of a steering system of the vehicle V1, an empirical and/or mathematic model. For example, turning the steering wheel to an extreme position to perform the minimum tuning radius will lead to mechanical damages to the steering system of the vehicle, and turning the steering wheel to an extreme position will generate safety problems such as loss of control of the vehicle. Therefore, the optimized compensation may be calculated based on the property of the vehicle steering system and ride experience and based on actual road experiments and/or a data model that is based on experimental data. The optimum turning radius is implemented as a sum of the minimum turning radius of the vehicle V1 and the optimized compensation. Thus, the mechanical damage to the vehicle has been avoided and the vehicle safety during turning has been improved.

Additionally, after the parking controller 12 calculates the optimum turning radius, it is possible that the optimum turning radius is greater than the maximum turning radius allowed in the current lane. At this point, the parking controller 12 may further perform the following operations: comparing the optimum turning radius with the maximum turning radius allowed in the current lane; if the optimum turning radius is greater than the maximum turning radius, adjusting the turning radius of the vehicle V1 to be between the minimum turning radius and the maximum turning radius; recalculating an arc road section with the adjusted turning radius as the actual turning radius of the vehicle; controlling behaviors of the vehicle such that the vehicle travels along the recalculated arc road section.

It is noted that, in this case, the maximum turning radius allowed in the current lane may be calculated by the vehicle. For example, the parking controller 12 computes the maximum turning radius based on lane information acquired from the external devices. The maximum turning radius allowed in the current lane may also be calculated at the external devices and then transmitted to the vehicle V1.

Moreover, the parking controller 12 may also include a verification strategy for checking whether the actual travelling path deviates from the parking navigation path.

According to the verification strategy, the parking controller 12 checks the actual position of the vehicle at the entering and exiting points of each road section to determine whether there is a deviation. That is, in the case that the vehicle can travel along a road section, the starting and ending points (e.g., two reference points limiting the road section) are used as checkpoints (i.e., the reference points) to determine whether the current actual position of the vehicle deviates from a corresponding checkpoint.

According to the verification strategy, in the case that the length of a road section is greater than or equal to the predetermined length threshold, one or more intermediate checkpoints may be included between the two reference points (i.e., the starting and ending points of the road section) on the road section. The one or more intermediate checkpoints, together with the starting and ending points of the road section, may be equally spaced along the road section. The one or more checkpoints, together with the parking navigation path, are transmitted to the vehicle V1 via the communication interface 11.

It is noted that the length of a linear road section may be determined by the distance between the starting and ending points of the linear road section, and the length of an arc road section may be determined by the radius of curvature and radians of the arc. Further, the operations of calculating the length of a linear or an arc road section, determining whether the length is greater than the predetermined length threshold, and setting one or more intermediate checkpoints may be performed at the external devices.

In one embodiment, the parking controller 12 calculates the deviation between the actual position of the vehicle V1 and the position of the corresponding checkpoint for each checkpoint. If the calculated deviation is less than or equal to the predetermined deviation threshold, the vehicle V1 is controlled to continue traveling along the parking navigation path. If the calculated deviation is greater than the deviation threshold, the vehicle V1 is controlled to brake and an abnormal signal is generated to indicate the vehicle V1 has deviated from the road section. The abnormal signal may be provided to the driver of the vehicle via a mobile application such that the driver drives the vehicle back to the parking navigation path. The anomaly signal may also be provided to a third party, e.g., a parking lot administrator, so that the third party can drive the vehicle back to the parking navigation path.

In this embodiment, the deviation may include a deviation in direction and a deviation in distance, and the deviation threshold may include a direction deviation threshold and a distance deviation threshold. The step of calculating a deviation includes calculating a deviation in direction and a deviation in distance. It is determined that the vehicle has deviated from the parking navigation path if at least one of the two conditions occurs: the calculated deviation in direction is greater than the direction deviation threshold and the calculated deviation in distance is greater than the distance deviation threshold.

In this embodiment, in the case where the calculating deviation is not zero and is less than or equal to the predetermined deviation threshold, the parking controller 12 may identify the status of the deviation and control travelling behaviors of vehicle such that the deviation is reduced. For example, if the parking controller 12 identifies that the vehicle V1 is deviated rightward by 30 cm from the parking navigation path (assuming the predetermined deviation threshold in distance is 50 cm), the vehicle V1 is controlled to travel leftward in order to reduce the deviation to the right.

Figure 5:
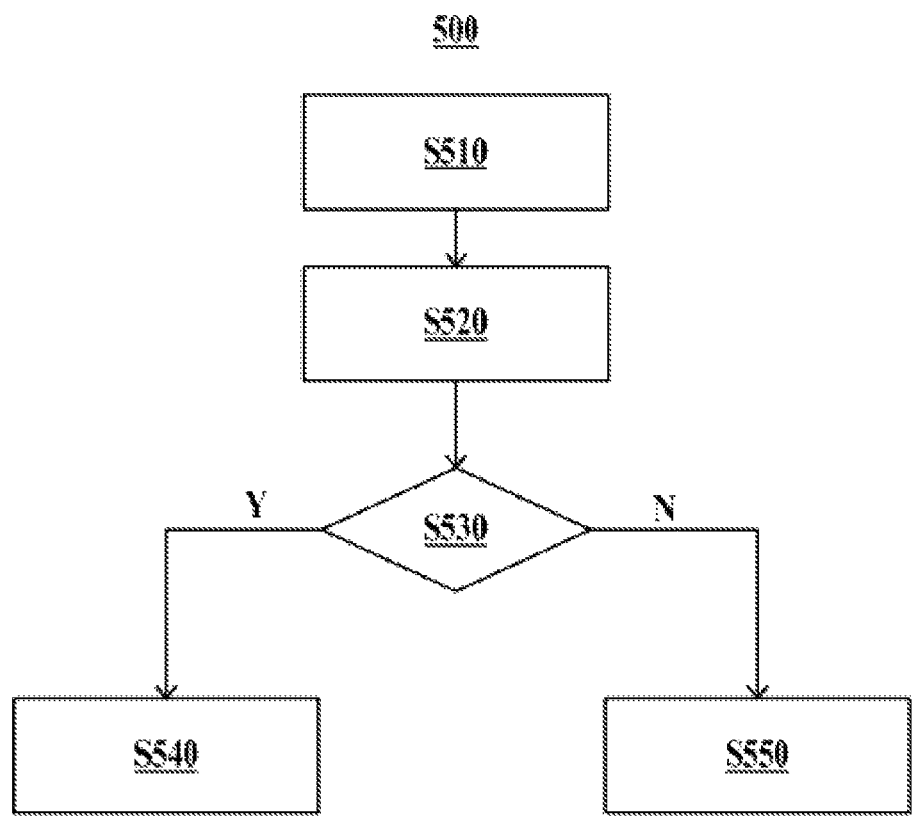
FIG. 5 is a schematic flowchart of an automatic parking assistance method according to one embodiment of the disclosure.

FIG. 5 shows an automatic parking assistance method 500 according to an embodiment of the disclosure. It is noted that the method 500 can be performed by using the above described automatic parking assistance device 10, and can also be performed by using the above described automatic parking assistance system 200. For this reason, various features described above with reference to the device 10 and the system 200 are also applicable in the automatic parking assistance method 500.

In step S510, the in-vehicle device 10 receives a parking navigation path via the communication interface 11. The parking navigation path includes one or more road sections and the one or more road sections include linear road sections and/or arc road sections.

In step S520, the parking controller 12 identifies line-shape features of each road section. The line-shape features include an orientation of a linear road section and/or a radius of curvature of an arc road section.

In step S530, the parking controller 12 determines whether the vehicle can travel along a road section based on line-shape features of the road section.

If the determination is affirmative in step S530, the method proceeds to step S540. In step 540, the parking controller 12 controls driving behaviors of the vehicle such that the vehicle travels along the road section.

If the determination is negative in step S530, the method proceeds to step S550. In step S550, the parking controller 12 determines a new travelling path and controls a driving behavior of the vehicle such that the vehicle travels along the new travelling path.

According to embodiments of the disclosure, the parking navigation path has been divided, based on its geometric features, "meticulously" at the external devices, and thus the complexity of travelling behaviors of a vehicle to complete the parking navigation path has been greatly reduced, because the vehicle can travel with the same travelling behaviors and travel with just several simple operations for each road section.

According to embodiments of the disclosure, the working time and workload of the vehicle for sensing road information, determining corresponding driving strategies and repeatedly adjusting driving behaviors are saved, which greatly improves the efficiency of automatic parking.

According to embodiments of the disclosure, before executing manipulations for automatic parking assistance at the vehicle, the parking navigation path used for guiding the automatic parking has been computed and accurately divided in an external device, and thus the passing ability of the vehicle during the automatic parking is greatly improved.

Further, an embodiment of the disclosure also checks whether the actual trajectory deviates from the parking navigation path and takes corresponding measures in case of deviation, which greatly improves the success rate and safety of the automatic parking.

It is noted that the articles "a" and "an" are intended to include one or more items, and may be used interchangeably with "one or more." Also, as used herein, the terms "has," "have," "having," and/or the like are intended to be open-ended terms. Further, the phrase "based on" is intended to mean "based, at least in part, on" unless explicitly stated otherwise.

While certain embodiments have been described, these embodiments have been presented by way of example only, and are not intended to limit the scope of the invention. The attached claims and their equivalents are intended to cover all the modifications, substitutions and changes as would fall within the scope and spirit of the invention.

The invention claimed is:

1. An in-vehicle device for automatic parking assistance of a vehicle, the in-vehicle device comprising:
   a communication interface through which the in-vehicle device receives a parking navigation path from an external device, the parking navigation path comprising one or more road sections, the one or more road sections comprising linear road sections or arc road sections or both; and
   a parking controller coupled with the communication interface, the parking controller being configured to:
      identify line-shape features of each road section, the line-shape features comprising an orientation of a linear road section or a radius of curvature of an arc road section, or both;
      determine whether the vehicle can travel along a road section based on line-shape features of the road section;
      in the case that the determination is affirmative, control a driving behavior of the vehicle such that the vehicle travels along the road section; and
      in the case that the determination is negative, determine a new travelling path and control a driving behavior of the vehicle such that the vehicle travels along the new travelling path;
      wherein, in the case that the current road section is identified as an arc road section with its radius of curvature being smaller than the minimum turning radius of the vehicle, the parking controller is configured to calculate an arc road section as the new travelling path, wherein an optimum turning radius is taken as a turning radius of the vehicle.

2. The in-vehicle device of claim 1, wherein, in the case that the current road section is identified as a linear road section, the parking controller is configured to control driving behaviors of the vehicle as follows such that the vehicle travels along the linear road section:
   between an entering point and an existing point of the linear road section, controlling a travelling direction of the vehicle to be identical to the linear road section's direction.

3. The in-vehicle device of claim 1, wherein the vehicle has a minimum turning radius, in the case that the current road section is identified as an arc road section with its radius of curvature being greater than or equal to the minimum turning radius, the parking controller is configured to control driving behaviors of the vehicle in the following way such that the vehicle travels along the arc road section:
   determining a steering angle of the vehicle for the arc road section; and
   controlling the vehicle to travel with the steering angle from an entering point of the arc road section to an existing point of the arc road section.

4. The in-vehicle device of claim 1, wherein, in the case that both the current and next adjacent road sections are identified as linear road sections with different orientations, the parking controller is configured to:
   calculate an arc road section, wherein an optimum turning radius is taken as a turning radius of the vehicle;
   acquire an intersection point of the calculated arc road section and the current road section as an entering point of a new travelling path, and an intersection point of the calculated arc road section and the next adjacent road section is an exiting point of the new travelling path;

determine a steering angle of the vehicle for the calculated arc road section; and control the vehicle to travel with the steering angle from the entering point to the exiting point.

5. The in-vehicle device of claim 4, wherein the optimum turning radius is the minimum turning radius of the vehicle, or the optimum turning radius is a sum of the minimum turning radius of the vehicle and an optimized compensation thereof.

6. The in-vehicle device of claim 5, wherein the optimized compensation is determined based on attributes of a vehicle steering system and empirical and/or mathematic models.

7. The in-vehicle device of claim 4, wherein the optimum turning radius is the minimum turning radius of the vehicle, or the optimum turning radius is a sum of the minimum turning radius of the vehicle and an optimized compensation thereof.

8. The in-vehicle device of claim 7, wherein the optimized compensation is determined based on attributes of a vehicle steering system and empirical and/or mathematic models.

9. The in-vehicle device of claim 1, wherein the parking controller is further configured to execute following operations for each of multiple checkpoints, the multiple checkpoints comprising entering and exiting points of each road section:
    calculating a deviation between an actual position of the vehicle and a corresponding checkpoint;
    controlling the vehicle to continually travel along the parking navigation path in the case that the calculated deviation is smaller than or equal to a deviation threshold;
    controlling the vehicle to brake and generate an abnormal signal indicating the vehicle has deviated from the current road section in the case that the calculated deviation is greater than the deviation threshold.

10. The in-vehicle device of claim 9, wherein, in the case that a length of a road section is greater than or equal to a length threshold, the multiple checkpoints further comprise one or more intermediate checkpoints on the road section.

11. The in-vehicle device of claim 9, wherein the deviation comprises a deviation in direction and a deviation in distance, and the deviation threshold comprises a direction deviation threshold and a distance deviation threshold, and
    in the case that at least one of the conditions of the calculated deviation in direction being greater than the direction deviation threshold and the calculated deviation in distance is greater than the distance deviation threshold occurs, the parking controller determines the vehicle has deviated from the road section.

12. The in-vehicle device of claim 9, wherein, in the case that the calculated deviation is not zero and is less than or equal to the deviation threshold, the parking controller is configured to identify a state of the deviation and control a driving behavior of the vehicle to reduce the deviation according to the state.

13. The in-vehicle device of claim 1, wherein the parking navigation path and one or more road sections based on geometric features of the parking navigation path are provided by the external device; and
    the external device comprises a remote server or a road facility.

14. The in-vehicle device of claim 1, wherein, the in-vehicle device is wirelessly communicated with the external device.

15. An automatic parking assistance system, comprising:
    a remote server wirelessly communicated with a vehicle, the remote server being configured to provide a parking navigation path for assisting automatic parking, and provide, based on geometric features of the parking navigation path, one or more road sections of the parking navigation path, the one or more road sections being linear road sections and/or arc road sections; and
    the in-vehicle device of claim 1 wirelessly communicated with the remote server, the in-vehicle device being configured to control a driving behavior of the vehicle based on the parking navigation path and line-shape features of the one or more road sections for the parking navigation path.

16. An automatic parking assistance method executed by the in-vehicle device of claim 1, the method comprising:
    receiving a parking navigation path, the parking navigation path comprising one or more road sections, the one or more road sections comprising linear road sections and/or arc road sections;
    identifying line-shape features of each road section, the line-shape features comprising an orientation of a linear road section and/or a radius of curvature of an arc road section;
    determining whether the vehicle can travel along a road section based on line-shape features of the road section;
    in the case that the determination is affirmative, controlling driving behaviors of the vehicle such that the vehicle travels along the road section; and
    in the case that the determination is negative, determining a new travelling path and control driving behaviors of the vehicle such that the vehicle travels along the new travelling path.

* * * * *